US008065730B1

(12) United States Patent
Sobel et al.

(10) Patent No.: US 8,065,730 B1
(45) Date of Patent: Nov. 22, 2011

(54) ANTI-MALWARE SCANNING IN A VIRTUALIZED FILE SYSTEM ENVIRONMENT

(75) Inventors: William E. Sobel, Stevenson Ranch, CA (US); Mark K. Kennedy, Redondo Beach, CA (US); Adam L. Glick, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 848 days.

(21) Appl. No.: 12/059,790

(22) Filed: Mar. 31, 2008

(51) Int. Cl.
*G06F 11/00* (2006.01)
*G06F 11/30* (2006.01)
(52) U.S. Cl. .......................................... 726/22; 713/188
(58) Field of Classification Search .............. 726/22–24; 713/188
See application file for complete search history.

(56) References Cited

U.S. PATENT DOCUMENTS

| 7,334,263 B2 * | 2/2008 | Szor ................................. 726/22 |
| 7,516,133 B2 * | 4/2009 | Kodama .............................. 1/1 |
| 7,865,677 B1 * | 1/2011 | Duprey et al. ................ 711/162 |

* cited by examiner

*Primary Examiner* — Eleni Shiferaw
*Assistant Examiner* — Ali Abyaneh
(74) *Attorney, Agent, or Firm* — Fenwick & West LLP

(57) ABSTRACT

A computer includes a file system that supports virtualization. A scanning module identifies a file to be scanned for malware and a virtualized file detection module determines whether the file is virtualized. A file retrieval module locates a virtualized version of the file if the file is determined to be virtualized, and a malware detection module determines whether the virtualized version of the file contains malware. If malware is found, the malware detection module takes remedial action to address any security threat posed by the malware.

17 Claims, 3 Drawing Sheets

ANTI-MALWARE SCANNING IN A VIRTUALIZED FILE SYSTEM ENVIRONMENT

BACKGROUND

1. Field of the Invention

This invention pertains in general to protecting a computer from malicious software and in particular to techniques for anti-malware scanning in a virtualized file system environment.

2. Description of the Related Art

A modern computer can be used by multiple users. The operating system running on the computer provides a file system that stores files for the users. The file system stores files in both shared and per-user locations. Some of these files can contain malicious software ("malware") such as viruses and worms that can harm the computer. An anti-malware scanning program, such as an antivirus scanner, can inspect the files to determine whether any of the files contain malware. If a file with malware is detected, a remedial action is taken such as removing the malware or alerting a user of the computer.

It is often desirable to scan only some of the files in the file system because a scan of the entire file system can require significant time and consume significant system resources. As a result, certain portions of the file system can be scanned that are likely to contain files that will be accessed or executed. These portions of the file system can include per-user locations, such as the home directories of each user, and various shared locations that are accessed by multiple users. Scanning only such portions is referred to as a "quick scan."

The operating system can provide the multiple users with varying permissions or privileges. Applications running under the control of a user generally have the same permissions as the user. A user has full read and write access to files in that user's dedicated locations but has limited access to certain files in shared locations. An administrator is a type of privileged user that has full access to all files maintained by the file system.

The operating system may support file system virtualization where files are multiplexed by the operating system. A user application attempting to access a file may be provided with a different version of the file based on the user, the rights of the user, or the type of application making the request. For example, if an application running under a user attempts to write to a shared file without having the necessary permissions to do so, the file system can make a copy of the file at another location and write to the copy, creating a different version. An application of the user that subsequently attempts to read or write to the shared file is redirected to user's version of the file. Several such per-user versions of a single shared file can exist under file system virtualization. File system virtualization enables a user application to apparently modify shared files without affecting the shared files as seen by other users of the system.

The per-user versions of shared files are stored in a particular area of the file system defined by the operating system. This area of the file system is not normally scanned during a quick scan, and as a result a quick scan may miss the per-user versions of shared files and any malware contained therein. Therefore, there is a need in the art for a way to locate and scan per-user versions of shared files in a virtualized file system environment when doing a quick scan.

BRIEF SUMMARY OF THE INVENTION

The above need is met by a system, method, and computer program product for scanning files for malware in a computer having a file system that supports virtualization. In an embodiment of the system and computer program product, a scanning module identifies a file to be scanned and a virtualized file detection module determines whether the file is virtualized. A file retrieval module locates a virtualized version of the file if the file is determined to be virtualized, and a malware detection module determines whether the virtualized version of the file contains malware.

In an embodiment of the method, a computer-implemented method of scanning files for malware in a computer having a file system that supports virtualization comprises identifying a file to be scanned, determining whether the file is virtualized, locating a virtualized version of the file if the file is determined to be virtualized, and determining whether the virtualized version of the file contains malware.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
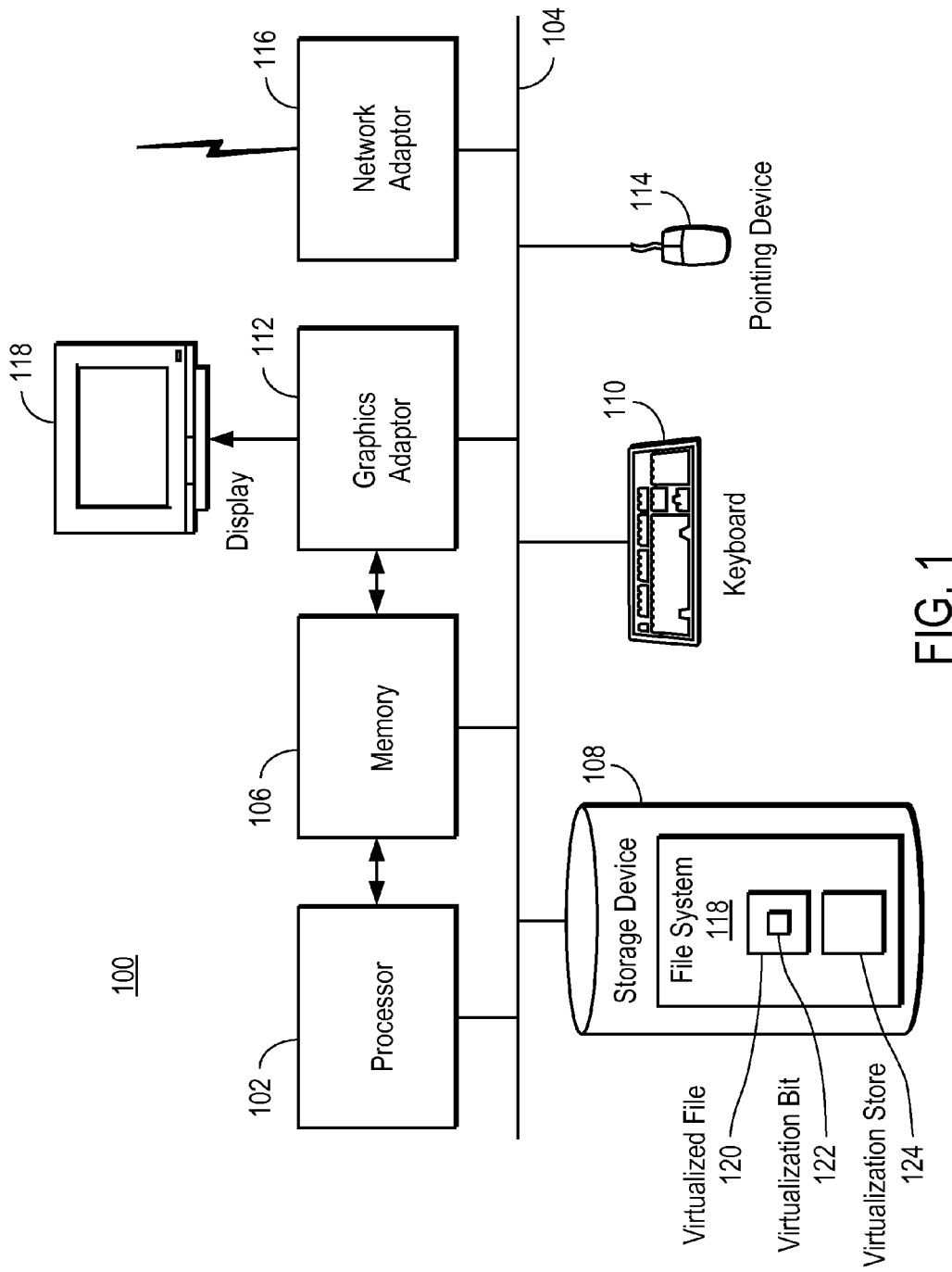
FIG. 1 is a high-level block diagram illustrating a computer for scanning files in a virtualized file system according to one embodiment.

FIG. 1 is a high-level block diagram illustrating a computer 100 for scanning files in a virtualized file system according to one embodiment. Illustrated are at least one processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112. The storage device 108 is a device such as a hard drive, CD or DVD drive, or flash memory device, and holds files containing executable code and/or data utilized during the operation of the computer 100. The memory 106, in one embodiment, is a random access memory (RAM) and holds instructions and data loaded from the storage device 108, generated during processing, and/or from other sources.

The storage device 108 contains files organized in a file system 118. The file system 118 can be, for example the New Technology File System (NTFS) used by some versions of MICROSOFT WINDOWS or the third extended file system (ext3) used by some versions of LINUX. The file system 118 supports file virtualization, also referred to as file system virtualization, as described below. Certain files in the file system 118 are virtualized files 120. Virtualized files 120 are shared files that have one or more per-user versions that are stored in the virtualization store 124. Each user that runs an application attempting to modify a virtualized file receives a private copy, or per-user version, of the file with the modifications. Files in the file system 118 have metadata including a virtualization bit 122 that indicates whether the file is virtualized.

Computers acting in different roles may have different and/or additional elements than the ones shown in FIG. 1. For example, a computer 100 acting as a server may have greater processing power and a larger storage device than a computer acting as a client. Likewise, a computer 100 acting as a server may lack devices such as a display 118 and/or keyboard 110 that are not necessarily required to operate it.

The computer 100 executes one or more operating systems such as a variant of MICROSOFT WINDOWS or LINUX. In one embodiment, the computer runs a version of WINDOWS VISTA supporting file virtualization. In general, the operating system executes one or more application programs.

The operating system and application programs executed by the computer are formed of one or more processes. This description utilizes the term "module" to refer to computer program logic for providing a specified functionality. A module can be implemented in hardware, firmware, and/or software. A module is typically stored on the storage device 108, loaded into the memory 106, and executed by the processor 102. A module can include one or more processes, and/or be provided by only part of a process.

Figure 2:
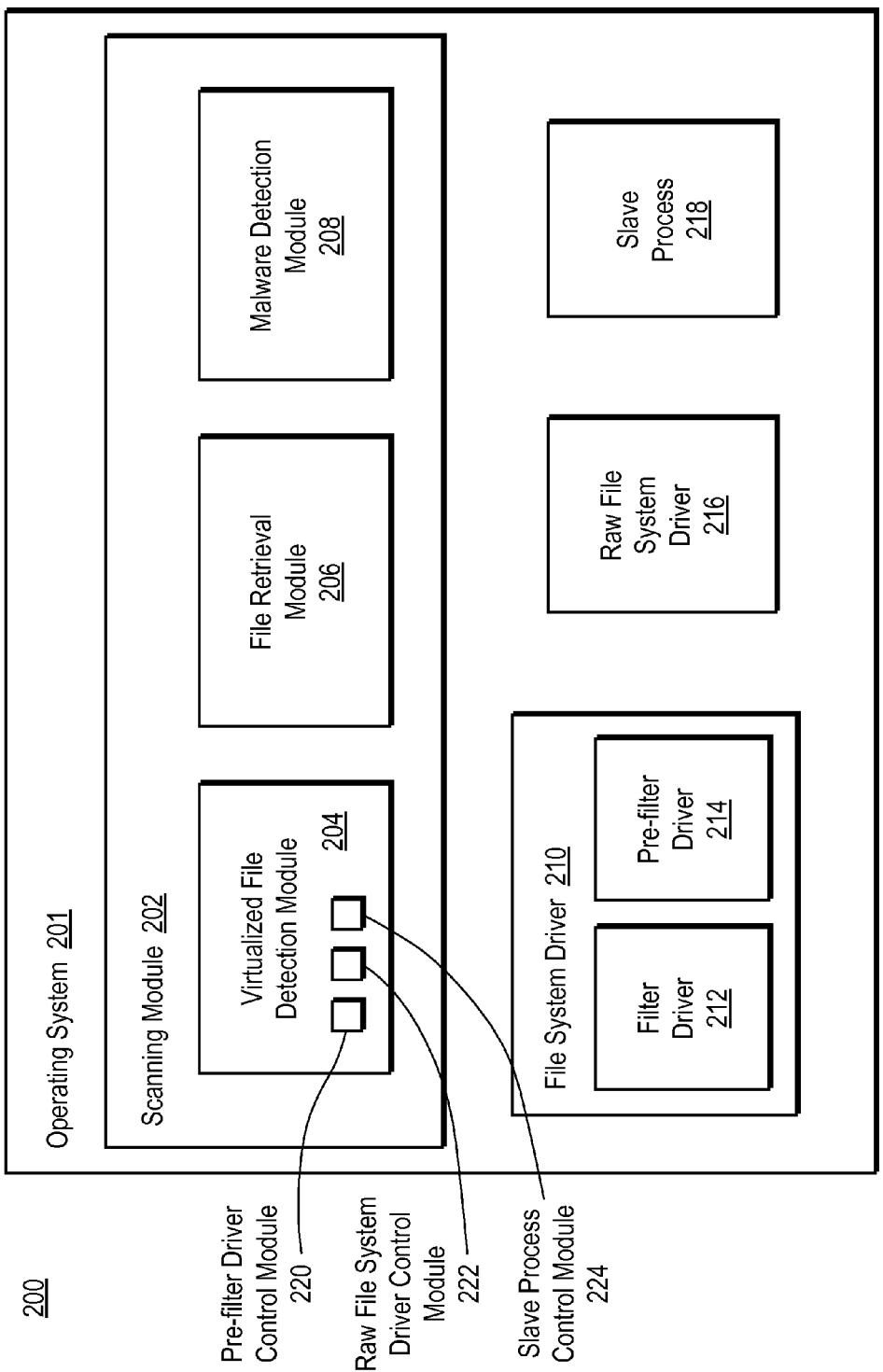
FIG. 2 illustrates a logical view of a computing environment provided by the processor and software according to one embodiment.

FIG. 2 illustrates a logical view of a computing environment 200 provided by the processor 102 and software according to one embodiment. The environment 200 includes an operating system 201 that runs a scanning module 202. The scanning module 202 runs in the operating system 201 but is not necessarily a part of the operating system. The scanning module 202 can be a separate application or part of another application. Other embodiments can have different and/or additional entities. In addition, the functionalities can be distributed among the entities in a different manner than is described above.

The operating system 201 is a standard operating system such as WINDOWS VISTA that supports file virtualization and multiple users with varying permissions, in one embodiment. For example, applications running under a user named UserA may have full access to a per-user directory, such as C:\Users\UserA\Startup, while applications under UserB have full access to C:\Users\UserB\Startup. Both users may also have limited (e.g., read-only) access to a shared system directory, such as C:\Shared\Startup. In an operating system without file virtualization, if UserA or UserB runs an application that attempts to write to the shared system directory, the write will fail, and the application may not be able to run correctly.

An operating system that supports file virtualization, such as operating system 201, provides a mechanism for a user application to apparently write to a shared location where the user does not have write permissions. When a user application first attempts to write to a shared file without the required permissions to do so, the operating system 201 makes the shared file into a virtualized file 120. The operating system 201 sets the virtualization bit 122 of the file to indicate that the file is virtualized, and copies the file to a virtualization store 124. The user application's writes are made to the virtualized file.

Subsequent accesses to the file by applications running under the user are redirected to the user's virtualized version of the file in the virtualization store 124. From the user's point of view, the user's application was successful in modifying the file in the shared directory even though the user did not have the required permission to do so. However, the actual file in the shared directory is unchanged, except for the possible setting of its virtualization bit 122. The virtualization store 124 may include several per-user virtualized versions of a single shared file. The locations of the per-user versions of a shared file in the virtual store 124 are related to the location of the original shared file. The relationship is known and predefined by the operating system 201.

As an example, suppose that there is a non-virtualized shared file C:\Shared\Startup\Settings.ini and that UserA and UserB have read-only access to this file. When UserA runs an application that attempts to write to (i.e., modify) this file, the operating system 201 sets the virtualization bit 122 of the file, making the file a virtualized file 120. The operating system 201 stores a copy of the file as C:\irtual Store\UserA\Startup\Settings.ini and makes the requested modifications to this copy of the file. This copy is referred to as UserA's virtualized version of the file. All further access by applications running under UserA are redirected to this version of the file.

Suppose UserB then attempts to read C:\Shared\Startup\Settings.ini. The operating system will recognize that UserB does not have its own version of the file, so the operating system will not redirect the read to the virtualization store 124, and UserB will see the original shared file. If UserB attempts to write to C:\Shared\Startup\Settings.ini, a version of the file will be created in C:\Virtual Store\UserB similar to the process described for UserA above. As a result, a virtualized file 120 may have a different virtualized version for each user, in addition to the original shared version.

Suppose PrivUser is an administrator that has read and write privileges for C:\Shared\Startup\Settings.ini. Though the file is virtualized, reads or writes by PrivUser are not redirected, but rather are applied directly to the original shared version.

The file system driver 210 is typically provided by the operating system and handles file accesses, including virtualized files 120, in one embodiment. When an application requests a file, the file system driver 210 first determines if virtualization is enabled for that application. In one embodiment, virtualization is enabled only for applications running without administrator privileges. Additionally, the application may need to have certain characteristics, such as being a 32-bit application or containing certain header information, for virtualization to be enabled for that application.

If virtualization is enabled for the application, the file system driver 210 checks the virtualization bit 122 of the file. If the virtualization bit 122 is set, the file system driver 210 determines if the virtualization store 124 contains a version of the file corresponding to the user running the application. If so, that version of the file is returned, otherwise the shared version of the file is returned. In any case, when the file is provided to the user application, the application is able to view the metadata associated with the file, including the virtualization bit 122. The application can determine if the virtualization bit 122 is set.

If virtualization is not enabled for the application (e.g., the application is running with administrator privileges), the file system driver 210 merely returns the shared version of the requested file, regardless of whether or not the file is virtualized. Additionally, the virtualization bit 122 of the returned file is set to indicate that the file is not virtualized (regardless of whether virtualized versions of the file exist). This setting of the virtualization bit 122 is performed by the filter driver 212. As a result, if virtualization is not enabled for the application, the application will always see the virtualization bit 122 set to indicate that the file is not virtualized, even if the file is virtualized. A pre-filter driver 214, further described below, can be added to the file system driver 210 to return the value of the virtualization bit 122 before it is set by the filter driver 212.

The scanning module 202 scans files in the file system 118 for malware such as viruses and worms that can harm the computer 100. In one embodiment, the scanning module 202 operates in a "quick scan" mode where it scans only the files in the file system that are likely to be accessed and executed. This mode is referred to as a quick scan. The scanning module 202 may be provided with predetermined locations to scan or may scan based the identity of the user currently logged on or based on commands from a user. For example, a quick scan may include the Startup folders of all users and the shared Startup folder (e.g., C:\Users\UserA\Startup, C:\Users\UserB\Startup, C:\Shared\Startup). Another quick scan may include the Startup folder of the currently logged in user and the shared startup folder (e.g., C:\Users\UserA\Startup and C:\Shared\Startup, if UserA is currently logged in).

If a quick scan is to be run on shared directories such as C:\Shared\Startup, it is desirable to also scan any virtualized per-user versions of files in these directories in order to detect malware in these files. The virtualized file detection module 204 detects whether or not a file in a shared directory is virtualized. For each virtualized file 120 detected by the virtualized file detection module 204, the virtualized store search module 206 finds desired virtualized per-user versions of the file in the virtualization store 124. The malware detection module 208 performs an anti-malware scan of the files specified by the quick scan, including virtualized file versions identified by the file retrieval module 206. The virtualized file detection module 204, the file retrieval module 206, and the malware detection module 208 are described further below.

The scanning module 202 and the virtualized file detection module 204 often run in applications or processes that do not have virtualization enabled. For example, the scanning module 202 may need to perform file or system operations that require administrator privileges and as a result the scanning module is run as an administrator privileged application. As mentioned above, virtualization is often not enabled for such applications.

The virtualized file detection module 204 detects whether a given file is virtualized. The virtualized file detection module 204 does this by reading the virtualization bit 122 of the file and determining its setting. If the virtualized file detection module 204 is running at a user level, the module can directly inspect the virtualization bit 122. However, since the scanning module 202 and the virtualized file detection module 204 are often run at an administrator privileged level, the filter driver 212 will set the virtualization bit 122 to indicate that the file is not virtualized when the file is accessed by the virtualized file detection module. As a result, the virtualized file detection module 204 often cannot determine whether a file is virtualized by directly reading the virtualization bit 122 since the value of the bit will always indicate that the file is not virtualized.

In one embodiment, the virtualized file detection module 204 includes a pre-filter driver control module 220 for controlling a pre-filter driver 214 that is able to examine the actual value of the virtualization bit 122 of a file and determine if it is virtualized. While the file system driver 210 and filter driver 212 are generally provided by the operating system 201, the pre-filter driver can be installed by the pre-filter driver control module 220. The pre-filter driver 214 is installed lower in the stack of the file system driver 210 than the filter driver 212 so that the virtualization bit 122 is still unchanged when it is read by the pre-filter driver. The pre-filter control module 220 can then obtain the actual value of the virtualization bit from the pre-filter driver 214.

In one embodiment, the virtualized file detection module 204 includes a raw file system driver control module 222 for controlling a raw file system driver 216 that is able to examine the actual value of the virtualization bit 122 of a file and determine if it is virtualized. The raw file system driver 216 can be installed by the raw file system driver control module 222. The raw file system driver 216 is able to directly access the file system 118 on the storage device 108 and parse the file system structure without using the file system driver 201. If the file system 118 type is NTFS, the raw file system driver 216 can look at the raw Master File Table (MFT) record in the file system 118. The MFT contains metadata about every file, directory and metafile on an NTFS volume, including the unmodified virtualization bit 122 of each file. The raw file system driver control module 222 can then obtain the actual value of the virtualization bit from the raw file system driver 216.

In one embodiment, the virtualized file detection module 204 includes a slave process control module 224 for controlling a slave process 218 that is able to examine the actual value of the virtualization bit 122 of a file and determine if it is virtualized. The slave process 218, or application, can be instantiated by the slave process control module 224. While the scanning module 202 may have virtualization disabled, the slave process 218 has virtualization enabled (e.g., runs at a user privilege level) and can examine the unmodified virtualization bit 122 of a file. The slave process control module 224 can then obtain the actual value of the virtualization bit from the slave process 218, for example through interprocess communication mechanisms.

The file retrieval module 206 finds virtualized versions of files that are determined to be virtualized by the virtualized file detection module 204. The file retrieval module 206 looks in the virtualization store 124 for these virtualized versions. In one embodiment, the operating system 201 stores virtualized versions of a particular file in predetermined directories in the virtualization store. For example, C:\Virtual Store can be a directory containing the virtualization store 124, and user subdirectories can contain per-user versions of virtualized files. The shared file C:\Shared\Startup\Settings.ini can have virtualized versions C:\Virtual Store\UserA\Startup\Settings.ini and C:\Virtual Store\UserB\Startup\Settings.ini, corresponding to UserA's and UserB's versions, respectively. As a result, the file retrieval module 206 can quickly determine the locations of the virtualized versions of a particular file in the virtualization store 124.

In one embodiment, it is desired to scan every user's versions of a shared file when doing a quick scan. In this case, if a virtualized file 120 is detected, the file retrieval module 206 can enumerate the users of the computer 100 and iteratively check the location in the virtualization store 124 where each user's version of the file would be located. Virtualized versions of the file may exist for only some of the users since only some users may have run applications that attempted to modify the file. In one embodiment, it is desired to look for only a particular user's virtualized version of a shared file when doing a quick scan. In this case, only the portion of the virtualization store 124 corresponding to that user is checked.

The malware detection module 208 performs an anti-malware scan of the files specified by the quick scan, including virtualized file per-user versions identified by the file retrieval module 206. In addition to scanning the per-user versions of a virtualized file, the malware detection module 208 scans the shared (privileged) version of the file. If the malware detection module 208 detects malware, the module can take remedial action such as removing the malware or alerting a user or administrator of the computer 100. If a file in the virtualization store 124 is found to contain malware, a message can be displayed or logged identifying the file as a particular user's version of an identified virtualized file 120.

Figure 3:
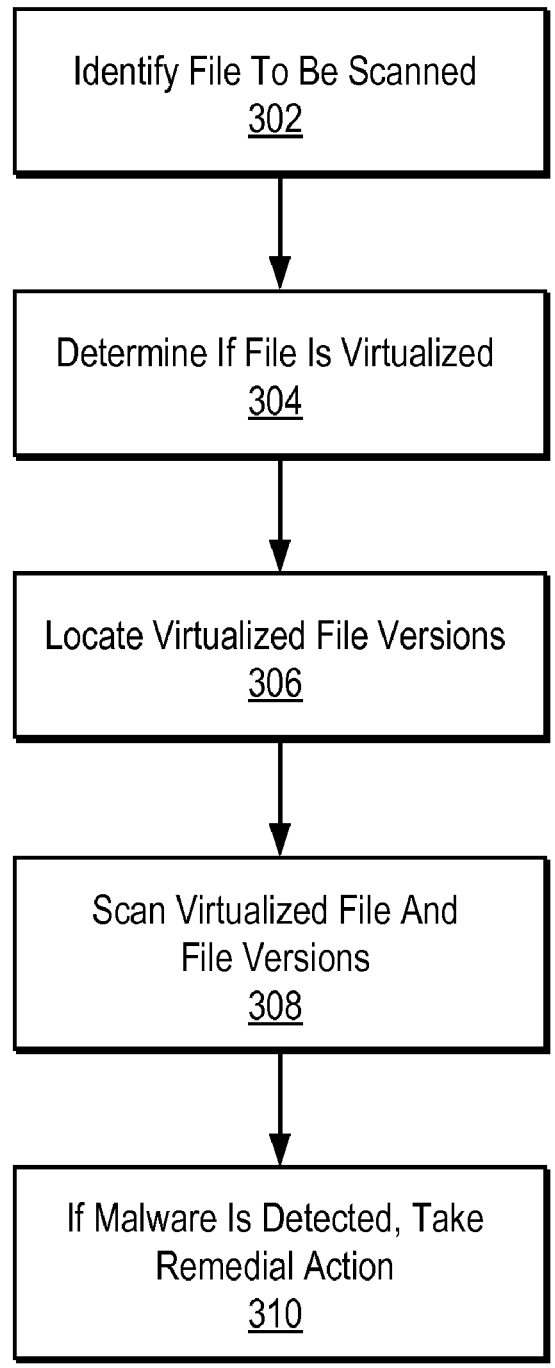
FIG. 3 is a flowchart illustrating the operation of the scanning module according to one embodiment.

FIG. 3 is a flowchart illustrating the operation of the scanning module 202 according to one embodiment. The scanning module identifies 302 a file in the file system 118 to be scanned. As mentioned above, the quick scan can be provided with a predetermined list of directories that are likely to contain malware or may identify files to be scanned based on other factors. The virtualized file detection module 204 determines 304 if the file is virtualized by checking whether the virtualization bit 122 is set. If the scanning module 202 is running with virtualization disabled (e.g., under administrator privileges), then the filter driver 212 sets the virtualization bit 122 of the file to indicate no virtualization, so the virtualized file detection module 204 uses one or more of the methods described above to obtain the actual value of the virtualization bit.

The file retrieval module 206 locates 306 virtualized file per-user versions of each of the virtualized files identified by the virtualized file detection module. The malware detection module 208 then scans 308 the virtualized file and versions of the file located in the virtualization store 124 for malware. If malware is detected, the malware detection module takes 310 remedial action such as removing the malware or alerting a user or administrator of the computer 100.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A system for scanning files for malware in a file system that supports virtualization, wherein an operating system provides a filter driver that modifies a value of a virtualization bit in the file system that indicates whether a shared file is virtualized, the system comprising:
   a non-transitory computer-readable storage medium storing executable computer program modules comprising:
      a scanning module for identifying a shared file to scan for malware;
      a virtualized file detection module with administrator privileges for determining that the shared file is virtualized as one or more virtualized versions by examining an unmodified virtualization bit of the shared file, wherein examining the unmodified virtualization bit comprises at least one of:
         reading the unmodified value of the virtualization bit before the virtualization bit is modified by the filter driver;
         parsing a structure of the file system to read the unmodified value of the virtualization bit; and
         running a slave process with virtualization enabled to read the unmodified value of the virtualization bit;
      a file retrieval module for locating the one or more virtualized versions of the shared file; and
      a malware detection module for determining whether the shared file and the located one or more virtualized versions of the shared file contain malware; and
   a processor for executing the computer program modules.

2. The system of claim 1, wherein a virtualized file detection module with administrator privileges for reading the unmodified value of the virtualization bit before the virtualization bit is modified by the filter driver comprises:
   a pre-filter driver control module for controlling a pre-filter driver that reads the value of the virtualization bit.

3. The system of claim 1, wherein a virtualized file detection module with administrator privileges for parsing a structure of the file system to read the unmodified value of the virtualization bit comprises:
   a raw file system driver control module for controlling a raw file system driver that reads the value of the virtualization bit directly from the file system.

4. The system of claim 1, wherein a virtualized file detection module with administrator privileges for running a slave process with virtualization enabled to read the unmodified value of the virtualization bit comprises:
   a slave process control module for controlling the slave process.

5. The system of claim 4, wherein the virtualized file detection module with administrator privileges for running a slave process with virtualization enabled is configured to run in a process with administrator privileges that has virtualization disabled and wherein the slave process runs with user privileges in order to enable virtualization.

6. The system of claim 1, wherein the file retrieval module is configured to locate a virtualized version of the shared file corresponding to each user of the computer.

7. A computer program product having a non-transitory computer-readable storage medium having executable computer program instructions recorded thereon for scanning files for malware in a computer having a file system that supports virtualization, wherein an operating system provides a filter driver that modifies a value of a virtualization bit in the file system that indicates whether a shared file is virtualized, the computer program product comprising:
   a scanning module for identifying a shared file to scan for malware;
   a virtualized file detection module with administrator privileges for determining that the shared file is virtualized as one or more virtualized versions by examining an unmodified virtualization bit of the shared file, wherein examining the unmodified virtualization bit comprises at least one of:
      reading the unmodified value of the virtualization bit before the virtualization bit is modified by the filter driver;
      parsing a structure of the file system to read the unmodified value of the virtualization bit; and
      running a slave process with virtualization enabled to read the unmodified value of the virtualization bit;
   a file retrieval module for locating the one or more virtualized versions of the shared file; and
   a malware detection module for determining whether the shared file and the located one or more virtualized versions of the shared file contain malware.

8. The computer program product of claim 7, wherein a virtualized file detection module with administrator privileges for reading the unmodified value of the virtualization bit before the virtualization bit is modified by the filter driver comprises:
   a pre-filter driver control module for controlling a pre-filter driver that reads the value of the virtualization bit.

9. The computer program product of claim 7, wherein a virtualized file detection module with administrator privileges for parsing a structure of the file system to read the unmodified value of the virtualization bit comprises:
   a raw file system driver control module for controlling a raw file system driver that reads the value of the virtualization bit directly from the file system.

10. The computer program product of claim 7, wherein a virtualized file detection module with administrator privileges for running a slave process with virtualization enabled to read the unmodified value of the virtualization bit comprises:

a slave process control module for controlling the slave process.

11. The computer program product of claim 10, wherein the virtualized file detection module with administrator privileges for running a slave process with virtualization enabled is configured to run in a process with administrator privileges that has virtualization disabled and wherein the slave process runs with user privileges in order to enable virtualization.

12. The computer program product of claim 7, wherein the file retrieval module is configured to locate a virtualized version of the shared file corresponding to each user of the computer.

13. A computer-implemented method of scanning files for malware in a computer having a file system that supports virtualization, wherein an operating system provides a filter driver that modifies a value of a virtualization bit in the file system that indicates whether a shared file is virtualized, comprising:

identifying a shared file to scan for malware;

determining, using administrator privileges, that the shared file is virtualized as one or more virtualized versions by examining an unmodified virtualization bit of the shared file, wherein examining the unmodified virtualization bit comprises at least one of:

reading the unmodified value of the virtualization bit before the virtualization bit is modified by the filter driver;

parsing a structure of the file system to read the unmodified value of the virtualization bit; and running a slave process with virtualization enabled to read the unmodified value of the virtualization bit;

locating the one or more virtualized versions of the shared file; and determining whether the shared file and the located one or more virtualized versions of the shared file contain malware.

14. The computer-implemented method of claim 13, wherein determining, using administrator privileges, that the shared files is virtualized by reading the unmodified value of the virtualization bit before the virtualization bit is modified by the filter driver comprises:

controlling a pre-filter driver that reads the value of the virtualization bit.

15. The computer-implemented method of claim 13, wherein determining, using administrator privileges, that the shared files is virtualized by parsing a structure of the file system to read the unmodified value of the virtualization bit comprises:

controlling a raw file system driver that reads the value of the virtualization bit directly from a file system containing the shared file.

16. The computer-implemented method of claim 13, wherein determining, using administrator privileges, that the shared files is virtualized by running a slave process with virtualization enabled to read the unmodified value of the virtualization bit comprises:

controlling the slave process.

17. The computer-implemented method of claim 16, wherein the slave process runs with user privileges in order to enable virtualization.

* * * * *